United States Patent
Chen et al.

(10) Patent No.: US 11,698,483 B2
(45) Date of Patent: Jul. 11, 2023

(54) OPTICAL FIBER WITH GRATINGS AND METHODS OF FORMING THEREOF

(71) Applicants: CORNING INCORPORATED, Corning, NY (US); UNIVERSITY OF PITTSBURGH—OF THE COMMONWEALTH SYSTEM OF HIGHER EDUCATION, Pittsburgh, PA (US)

(72) Inventors: Peng Chen, Pittsburgh, PA (US); Ming-Jun Li, Horseheads, NY (US); Jingyu Wu, Pittsburgh, PA (US); Jieru Zhao, Pittsburgh, PA (US)

(73) Assignees: Corning Incorporated, Corning, NY (US); University of Pittsburgh—of the Commonwealth System of Higher Education, Pittsburgh, PA (US)

(*) Notice: Subject to any disclaimer, the term of this patent is extended or adjusted under 35 U.S.C. 154(b) by 0 days.

(21) Appl. No.: 17/538,285

(22) Filed: Nov. 30, 2021

(65) Prior Publication Data
US 2022/0171122 A1    Jun. 2, 2022

Related U.S. Application Data

(60) Provisional application No. 63/119,199, filed on Nov. 30, 2020.

(51) Int. Cl.
*G02B 6/02* (2006.01)
*C03C 25/6226* (2018.01)

(52) U.S. Cl.
CPC ..... *G02B 6/02104* (2013.01); *G02B 6/02128* (2013.01); *C03C 25/6226* (2013.01)

(58) Field of Classification Search
CPC ............ G02B 6/02104; G02B 6/02128; G02B 6/02138; G02B 6/0281; G02B 6/0365;
(Continued)

(56) References Cited

U.S. PATENT DOCUMENTS 6,396,983 B1    5/2002  Atkins et al.
6,603,901 B1 *  8/2003  Hale .................. G02B 6/02104
                                                     385/128

(Continued)

FOREIGN PATENT DOCUMENTS

WO    2017/172467 A1    10/2017

OTHER PUBLICATIONS

Ficocelli, "Automated manufacturing of fiber Bragg grating arrays," in Optical Fiber Sensors, OSA Technical Digest (CD) (Optical Society of America, 2006), 4 pages.
(Continued)

*Primary Examiner* — Ellen E Kim
(74) *Attorney, Agent, or Firm* — Robert L. Carlson

(57) ABSTRACT

Embodiments of the current disclosure include small diameter single-mode optical fibers having gratings and methods of forming thereof. In some embodiments, methods of forming a small diameter single-mode optical fibers having gratings include providing an optical fiber having a core and cladding with a combined outer diameter of 100 μm to 125 μm and a coating having a thickness of less than or equal to 20 μm, wherein the coating comprises one of: (i) a high-modulus coating layer surrounding the cladding region; or (ii) a low-modulus coating layer surrounding the cladding region and a high-modulus coating layer surrounding the low-modulus coating layer; and exposing the core, through the coating, to a pattern of ultraviolet radiation to form an optical grating within the core.

20 Claims, 6 Drawing Sheets

(58) Field of Classification Search
CPC ...... G02B 2006/02161; C03C 25/6226; C03C 25/1065
See application file for complete search history.

(56) References Cited

U.S. PATENT DOCUMENTS

| | | | | |
|---|---|---|---|---|
| 6,751,380 | B1* | 6/2004 | Imamura | G02B 6/02138 385/128 |
| 9,766,396 | B2 | 9/2017 | Kremp et al. | |
| 2003/0206697 | A1* | 11/2003 | Atkins | G02B 6/0219 385/37 |
| 2011/0217011 | A1* | 9/2011 | Bennett | G02B 6/03655 385/124 |
| 2017/0204290 | A1* | 7/2017 | Simoff | C09D 183/06 |
| 2020/0123052 | A1* | 4/2020 | Schwartz | G01K 11/32 |
| 2020/0192040 | A1* | 6/2020 | Li | G02B 6/443 |
| 2021/0331969 | A1* | 10/2021 | Ren | C03C 25/285 |
| 2021/0395143 | A1* | 12/2021 | Biddix | C03C 25/26 |
| 2022/0026627 | A1 | 1/2022 | Bickham et al. | |

OTHER PUBLICATIONS

G. Scott Glaesemann et al., "Quantifying the Puncture Resistance of Optical Fiber Coatings", published in the Proceedings of the 52nd International Wire & Cable Symposium, pp. 237-245 (2003).

Ortiz et al., "Continuous multicore optical fiber grating arrays for distributed sensing applications", J. Lightwave Technol., vol. 35, 2017, pp. 1248-1252.

* cited by examiner

OPTICAL FIBER WITH GRATINGS AND METHODS OF FORMING THEREOF

CROSS-REFERENCE TO RELATED APPLICATIONS

This application claims the benefit of priority under 35 U.S.C. § 119 of U.S. Provisional Application Ser. No. 63/119,199 filed on Nov. 30, 2020, the content of which is relied upon and incorporated herein by reference in its entirety.

FIELD OF THE DISCLOSURE

This disclosure pertains to optical fibers. More particularly, this disclosure pertains to single-mode optical fibers. Most particularly, this disclosure pertains to small diameter single-mode optical fibers having gratings.

BACKGROUND OF THE DISCLOSURE

Rayleigh-based distributed optical fiber sensors (DOFSs) are useful for detecting changes in temperature, strain, pressure, relative humidity, chemical concentration, radiation, etc. These sensors can find many applications in security and leak monitoring on oil and gas pipelines, intrusion detection, and for down-hole sensing in oil wells, etc. in Rayleigh scatter based distributed fiber optic sensing, a coherent laser pulse is sent along an optic fiber, and Rayleigh scattering along the fiber causes the fiber to act as a distributed interferometer with a gauge length approximately equal to the pulse length. The intensity of the reflected light is measured as a function of time after transmission of the laser pulse. Changes in the reflected intensity of successive pulses from the same region of fiber are caused by changes in the optical path length of that section of fiber. A major limitation of DOFSs is the low Rayleigh scattering intensity of conventional optical fibers which limits the resolution and sensitivity of fiber sensors.

To address the low Rayleigh scattering problem, different approaches have been investigated. Rayleigh backscattered power can be increased by raising the numerical aperture (NA) of the fiber to increase the capture efficiency for backscattered light. However, within the practical single mode fiber design space, the increase of capture efficiency is less than 2 dB. Adding scattering particles can also increase scattering, but this approach typically increases the attenuation of the fiber. Another approach involves laser processing of optical fiber to increase the optical backscattering. It is well known that exposure of optical fiber to pulsed radiation may increase the Rayleigh scattering. The backscattering can be increased further by forming periodic or quasi-periodic Bragg gratings. Such a Bragg gratings can be applied over long fiber lengths without increasing the fiber attenuation significantly. One method of fabricating gratings over a long length of fiber can be done with UV exposure during the fiber draw before the coating is applied. However, aligning the laser system with the fiber during fiber draw is difficult, especially with the fiber vibration during the draw. Another method of fabricating gratings over a long length of fiber can be done after the fiber draw requires removing the coating, fabricating the gratings, and recoating the fiber for protection. However, in this method, the coating applied during the fiber draw is wasted and the coating removal process may introduce defects on glass surface that can cause fiber reliability issues.

Improvements in the foregoing are desired. Accordingly, the inventors have developed small diameter single-mode optical fibers having gratings and methods of forming thereof.

SUMMARY

A first embodiment of the present disclosure includes a method, comprising: providing an optical fiber comprising a core region, a cladding region surrounding the core region and a coating surrounding the cladding region; wherein the core and cladding have a combined outer diameter of 100 μm to 125 μm, wherein the coating has a thickness of less than or equal to 20 um, and wherein the coating comprises one of: (i) a high-modulus coating layer surrounding the cladding region, wherein the high-modulus coating layer has a Young's modulus of greater than or equal to 0.5 GPa, or (ii) a low-modulus coating layer surrounding the cladding region and a high-modulus coating layer surrounding the low-modulus coating layer, wherein the low-modulus coating layer has a Young's modulus of less than or equal to 5 MPa and the high-modulus coating layer has a Young's modulus of greater than or equal to 0.5 GPa; and exposing the core, through the coating, to a pattern of ultraviolet radiation to form an optical grating within the core.

A second embodiment of the present disclosure may include the first embodiment, wherein a ratio of a thickness of the low-modulus coating layer to a thickness of the high-modulus coating layer is from 0.8 to 1.2.

A third embodiment of the present disclosure may include the first embodiment, wherein the coated optical fiber has a diameter of less than or equal to 145 μm A fourth embodiment of the present disclosure may include the first embodiment, wherein the cladding of the optical fiber comprises a Titania-doped layer.

A fifth embodiment of the present disclosure may include the fourth embodiment, wherein the Titania-doped layer comprises a Titania doping concentration of about 5 wt % to about 25 wt %.

A sixth embodiment of the present disclosure may include the fourth embodiment, wherein the thickness of the Titania-doped layer is 1 μm to 20 μm.

A seventh embodiment of the present disclosure may include the first embodiment, wherein the coating has a thickness of less than or equal to 15 μm.

A eighth embodiment of the present disclosure may include the first embodiment, wherein the coating has a thickness of less than or equal to 10 μm.

A ninth embodiment of the present disclosure may include the first to eighth embodiment, wherein the coating has a thickness of less than or equal to 2 μm.

A tenth embodiment of the present disclosure may include the first embodiment, wherein the coating is a UV curable material.

A eleventh embodiment of the present disclosure may include the first embodiment, wherein the optical grating is continuous.

A twelfth embodiment of the present disclosure may include the first embodiment, wherein the optical grating is discrete.

A thirteenth embodiment of the present disclosure may include the first embodiment, wherein the optical grating has a period of about 200 nm to about 1500 microns.

A fourteenth embodiment of the present disclosure may include the first embodiment, wherein the optical grating reflectivity is about $1 \times 10^{-6}$ to about $2 \times 10^{-4}$ per meter.

A fifteenth embodiment of the present disclosure may include the first embodiment, further comprising transferring the optical fiber from a first reel to a second reel while exposing the core, through the coating, to a pattern of ultraviolet radiation to form an optical grating within the core.

A sixteenth embodiment of the present disclosure includes an optical fiber comprising a core region having a plurality of optical gratings within the core; a cladding region surrounding the core region, wherein the core and cladding have a combined outer diameter of 100 µm to 125 µm; and a coating surrounding the cladding region, wherein the coating has a thickness of less than or equal to 20 µm, and wherein the coating comprises one of: (i) a high-modulus coating layer surrounding the cladding region, wherein the high-modulus coating layer has a Young's modulus of greater than or equal to 0.5 GPa; or (ii) a low-modulus coating layer surrounding the cladding region and a high-modulus coating layer surrounding the low-modulus coating layer, wherein the low-modulus coating layer has a Young's modulus of less than or equal to 5 MPa and the high-modulus coating layer has a Young's modulus of greater than or equal to 0.5 GPa.

A seventeenth embodiment of the present disclosure may include the sixteenth embodiment, wherein a ratio of a thickness of the low-modulus coating layer to a thickness of the high-modulus coating layer is from 0.8 to 1.2.

A eighteenth embodiment of the present disclosure may include the sixteenth embodiment, wherein the coated optical fiber has a diameter of less than or equal to 145 µm.

A nineteenth embodiment of the present disclosure may include the sixteenth embodiment, wherein the cladding of the optical fiber comprises a Titania-doped layer.

A twentieth embodiment of the present disclosure may include the nineteenth embodiment, wherein the Titania-doped layer comprises a Titania doping concentration of about 5 wt % to about 25 wt %.

A twenty-first embodiment of the present disclosure may include the first to nineteenth embodiment, wherein the thickness of the Titania-doped layer is 1 µm to 20 µm.

A twenty-second embodiment of the present disclosure include the first to sixteenth embodiment, wherein the coating has a thickness of less than or equal to 15 µm.

A twenty-third embodiment of the present disclosure may include the sixteenth embodiment, wherein coating has a thickness of less than or equal to 10 µm.

A twenty-fourth embodiment of the present disclosure may include the sixteenth embodiment, wherein the coating has a thickness of less than or equal to 2 µm.

A twenty-fifth embodiment of the present disclosure may include the sixteenth embodiment, wherein the coating is a UV curable material.

A twenty-sixth embodiment of the present disclosure may include the sixteenth embodiment, wherein the optical grating is continuous.

A twenty-seventh embodiment of the present disclosure may include the sixteenth embodiment, wherein the optical grating is discrete.

A twenty-eighth embodiment of the present disclosure may include the sixteenth embodiment, wherein the optical grating has a period of about 200 nm to about 1500 microns.

A twenty-ninth embodiment of the present disclosure may include the sixteenth embodiment, wherein the optical grating reflectivity is about $1\times10^{-6}$ to about $2\times10^{-4}$ per meter.

A thirtieth embodiment of the present disclosure includes a multicore optical fiber, comprising: a control system comprising a light source, a light detector, and a processor; an optical fiber; and a light transmitting member operably coupling the optical fiber to the control system, wherein the optical fiber comprises: a core region having a plurality of optical gratings within the core; a cladding region surrounding the core region, wherein the core and cladding have a combined outer diameter of 100 µm to 125 µm; and a coating surrounding the cladding region, wherein the coating has a thickness of less than or equal to 20 µm, and wherein the coating comprises one of: (i) a high-modulus coating layer surrounding the cladding region, wherein the high-modulus coating layer has a Young's modulus of greater than or equal to 0.5 GPa; or (ii) a low-modulus coating layer surrounding the cladding region and a high-modulus coating layer surrounding the low-modulus coating layer, wherein the low-modulus coating layer has a Young's modulus of less than or equal to 5 MPa. and the high-modulus coating layer has a Young's modulus of greater than or equal to 0.5 GPa.

Additional features and advantages will be set hath in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
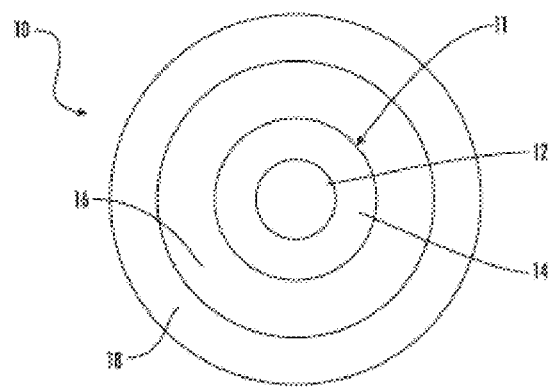
FIG. 1 is a schematic view of a coated optical fiber in accordance with some embodiments of the current disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification, and in the claims, which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. Δ or Δ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (1) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r)\% = 100 \frac{(n_i^2 - n_{ref}^2)}{2n_i^2} \quad (1)$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by Δ (or "delta") or Δ % (or "delta %") and its values are given in units of "%", unless otherwise specified. Relative refractive index may also be expressed as Δ(r) or Δ(r) %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region.

The refractive index of an optical fiber profile may be measured using commercially available devices, such as the IFA-100 Fiber Index Profiler (Interfiber Analysis LLC, Sharon, Mass. USA) or the S14 Refractive Index Profiler (Photon Kinetics, Inc., Beaverton, Oreg. USA). These devices measure the refractive index relative to a measurement reference index, $n(r)-n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index n(r) is then used to calculate the relative refractive index as defined by Eq. (1).

The term "α-profile" or "alpha profile" refers to a relative refractive index profile Δ(r) that has the functional form defined in Eq. (3):

$$\Delta(r) = \Delta(r_0)\left[1 - \left[\frac{|r - r_0|}{(r_z - r_0)}\right]^\alpha\right] \quad (3)$$

where $r_o$ is the radial position at which Δ(r) is maximum, $\Delta(r_0)>0$, $r_z>r_0$ is the radial position at which Δ(r) decreases to its minimum value, and r is in the range $r_i \leq r \leq r_f$, where $r_i$ is the initial radial position of the α-profile, re is the final radial position of the α-profile, and α is a real number. $\Delta(r_0)$ for an α-profile may be referred to herein as $\Delta_{max}$ or, when referring to a specific region i of the fiber, as $\Delta_{imax}$. When the relative refractive index profile of the fiber core region is described by an α-profile with $r_0$ occurring at the centerline (r=0), $r_z$ corresponding to the outer radius $r_1$ of the core region, and $\Delta_1(r_1)$=0, Eq. (3) simplifies to Eq. (4):

$$\Delta_1(r) = \Delta_{1max}\left[1 - \left[\frac{r}{r_1}\right]^\alpha\right] \qquad (4)$$

Figure 5:
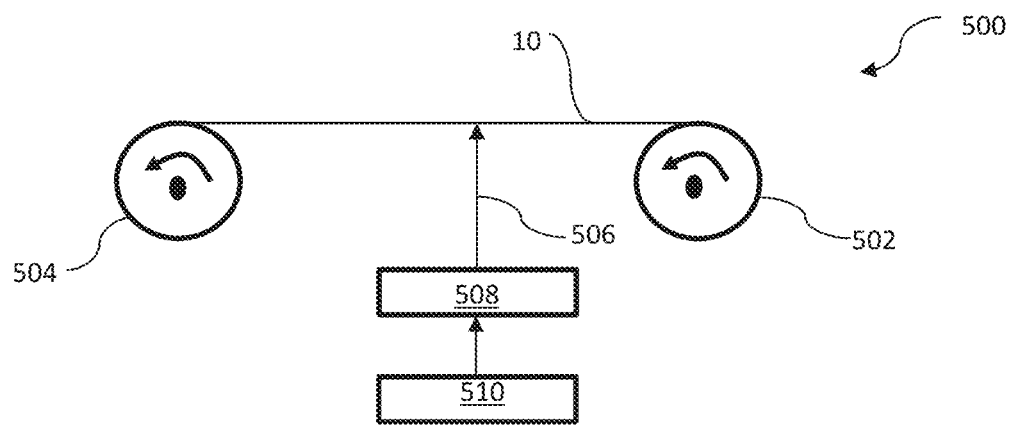
FIG. 5 depicts an exemplary system for forming Bragg gratings on the core region of an optical fiber in accordance with some embodiments of the current disclosure.
Figure 6:
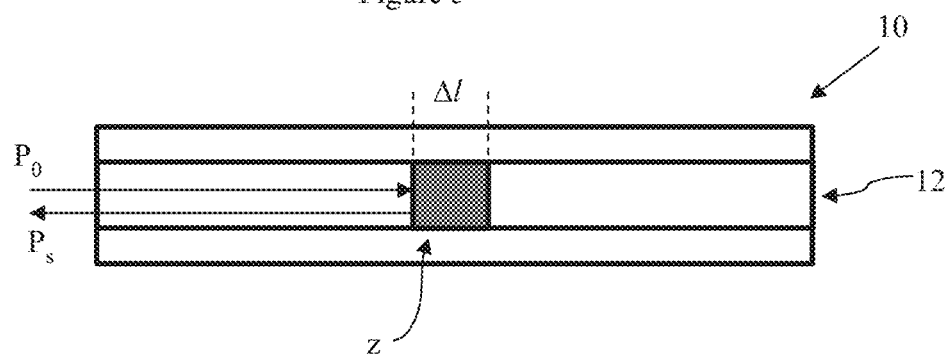
FIG. 6 depicts an exemplary Rayleigh backscattering based distributed sensing system.

When the core region has an index described by Eq. (4), the outer radius $r_1$ can be determined from the measured relative refractive index profile by the following procedure. Estimated values of the maximum relative refractive index $\Delta_{1max}$, α, and outer radius $r_{1est}$ are obtained from inspection of the measured relative refractive index profile and used to create a trial function $\Delta_{trial}$ between $r=-r_{1est}$ and $r=r_{1est}$. Relative refractive index profiles of representative glass fibers having cores described by an α-profile, in accordance with embodiments of the present disclosure, are shown in FIGS. 5 and 6.

"Trench volume" is defined as:

$$V_{Trench} = \left|2\int_{r_{Trench,inner}}^{r_{Trench,outer}} \Delta_{Trench}(r)rdr\right| \qquad (5)$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % Δ micron², % Δ-micron², % Δ-µm², or % Δµm², whereby these units can be used interchangeably herein. A trench region is also referred to herein as a depressed-index cladding region and trench volume is also referred to herein as $V_3$.

The "mode field diameter" or "MFD" of an optical fiber is defined in Eq. (6) as:

MFD=2w $$w^2 = 2\frac{\int_0^\infty (f(r))^2 rdr}{\int_0^\infty \left(\frac{df(r)}{dr}\right)^2 rdr} \qquad (6)$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in Eq. (7) as:

$$A_{eff} = \frac{2\pi\left[\int_0^\infty (f(r))^2 rdr\right]^2}{\int_0^\infty (f(r))^4 rdr} \qquad (7)$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power as the signal travels along the optical fiber. Attenuation was measured as specified by the IEC-60793-1-40 standard, "Attenuation measurement methods."

The bend resistance of an optical fiber, expressed as "bend loss" herein, can be gauged by induced attenuation under prescribed test conditions as specified by the IEC-6079-1-47 standard, "Measurement methods and test procedures—Macrobending loss." For example, the test condition can entail deploying or wrapping the fiber one or more turns around a mandrel of a prescribed diameter, e.g., by wrapping one turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

"Cable cutoff wavelength," or "cable cutoff," as used herein, refers to the 22 m cable cutoff test as specified by the IEC 60793-1-44 standard, "Measurement methods and test procedures—Cut-off wavelength."

The optical fibers disclosed herein include a core region, a cladding region surrounding the core region, and a coating surrounding the cladding region. The core region and cladding region are glass. In some embodiments, the cladding region includes multiple regions. The multiple cladding regions are preferably concentric regions. In some embodiments, the cladding region includes an inner cladding region, a depressed-index cladding region, and an outer cladding region. The inner cladding region surrounds and is directly adjacent to the core region. The depressed-index cladding region surrounds and is directly adjacent to the inner cladding region such that the depressed-index cladding region is disposed between the inner cladding and the outer cladding in a radial direction. The outer cladding region surrounds and is directly adjacent to the depressed-index cladding region. The depressed-index cladding region has a lower relative refractive index than the inner cladding and the outer cladding region. The depressed-index cladding region may also be referred to herein as a trench or trench region. The relative refractive index of the inner cladding region may be less than, equal to, or greater than the relative refractive index of the outer cladding region. The depressed-index cladding region may contribute to a reduction in bending losses and microbending sensitivity. The core region, inner cladding region, depressed-index cladding region, and outer cladding region are also referred to as core, cladding, inner cladding, depressed-index cladding, and outer cladding, respectively.

Whenever used herein, radial position $r_1$ and relative refractive index $\Delta_1$ or $\Delta_1(r)$ refer the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed-index cladding region, radial position $r_4$ and relative refractive index $\Delta_4$ or $\Delta_4(r)$ refer to the outer cladding region, radial position $r_5$ refers to the optional low-modulus inner coating, radial position $r_6$ refers to the high-modulus coating, and the radial position $r$ refers to the optional pigmented outer coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding region, outer cladding region, low-modulus coating, and high-modulus coating are substantially annular in shape. Annular regions are characterized in terms of an inner radius and an outer radius. Radial positions $r_1$, $r_2$, $r_3$, $r_4$, $r_5$, $r_6$ and $r_7$ refer herein to the outermost radii of the core, inner cladding, depressed-index cladding, outer cladding, optional low-modulus inner coating, high-modulus coating, and optional pigmented outer coating, respectively. The radius $r_6$ also corresponds to the outer radius of the optical fiber in embodiments without a pigmented outer coating. The pigmented outer coating may have a high-modulus. When a pigmented outer coating is present, the radius $r_7$ corresponds to the outer radius of the optical fiber.

When two regions are directly adjacent to each other, the outer radius of the inner of the two regions coincides with the inner radius of the outer of the two regions. The optical fiber, for example, includes a depressed-index cladding region surrounded by and directly adjacent to an outer cladding region. The radius $r_3$ corresponds to the outer radius of the depressed-index cladding region and the inner radius of the outer cladding region. The relative refractive index profile also includes a depressed-index cladding region surrounding and directly adjacent to an inner cladding region. The radial position $r_2$ corresponds to the outer radius of the inner cladding region and the inner radius of the depressed-index cladding region. Similarly, the radial position $r_1$ corresponds to the outer radius of the core region and the inner radius of the inner cladding region.

The difference between radial position $r_2$ and radial position $r_1$ is referred to herein as the thickness of the inner cladding region. The difference between radial position $r_3$ and radial position $r_2$ is referred to herein as the thickness of the depressed-index cladding region. The difference between radial position $r_4$ and radial position $r_3$ is referred to herein as the thickness of the outer cladding region. The difference between radial position $r_5$ and radial position $r_4$ is referred to herein as the thickness of the low-modulus coating. The difference between radial position $r_6$ and radial position $r_5$ is referred to herein as the thickness of the high-modulus coating.

As will be described further hereinbelow, the relative refractive indices of the core region, inner cladding region, depressed-index cladding region, and outer cladding region may differ. Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include Fluorine and Boron. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions.

Values of Young's modulus, % elongation, and tear strength refer to values as determined under the measurement conditions by the procedures described herein.

Reference will now be made in detail to illustrative embodiments of the present description.

Figure 9:
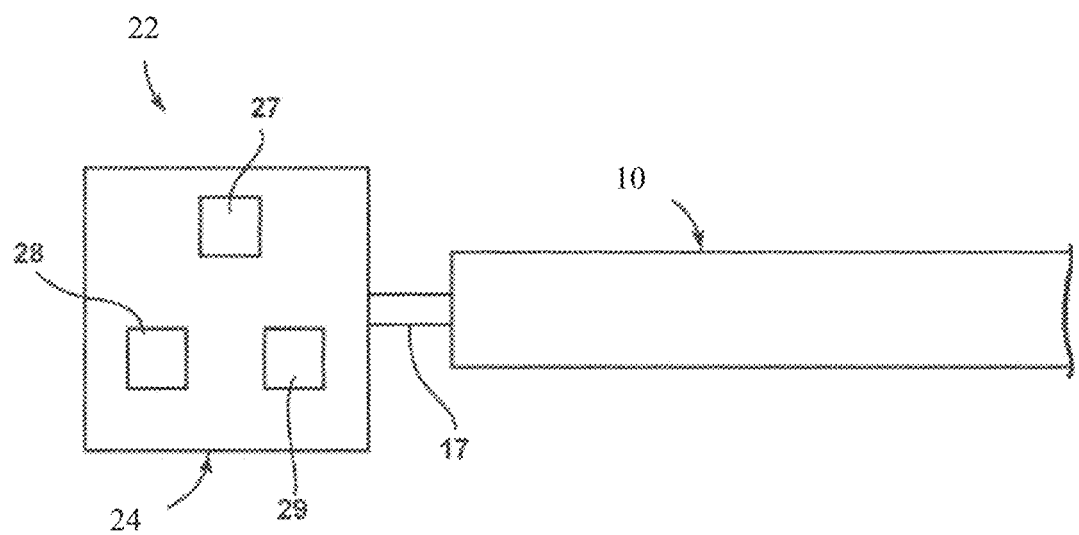
FIG. 9 is a schematic diagram of one embodiment of optical fiber sensing system that employs a optical fiber in accordance with some embodiments of the current disclosure.

FIG. 9 is a schematic diagram of one embodiment of optical fiber sensing system that employs a optical fiber in accordance with some embodiments of the current disclosure. As depicted in FIG. 9, a fiber sensor 22 includes an optical fiber 10 and a control system 24. The optical fiber 10 and the control system 24 may be operably coupled by a light transmitting member 17. The control system 24 may include a light source 27, a light detector 28, and a processor 29.

In a Rayleigh backscattering based distributed sensing system as shown in FIG. 6, a laser pulse with power of $P_0$ is launched into the optical fiber 10. At a location of z, part of the power $P_s$ is reflected as given by Equation (8)

$$P_s = C\alpha_s \Delta l P_0 e^{-2\alpha z} \qquad (8)$$

where $\alpha s$ is the scattering coefficient, C is the capture coefficient for the scattered light, $\alpha$ is the loss coefficient, $\Delta l$ is the pulse sensing segment that is related to pulse width. For Rayleigh scattering based sensors, the capture efficiency is given by Equation (9)

$$C = \frac{3v_g}{k_0^2 n_{eff}^2 D_{MF}^2} \qquad (9)$$

where $v_g$ is the group velocity, $n_{eff}$ is the effective index, $k_0$ is the wavenumber, $D_{MF}$ is the mode filed diameter. Because the Rayleigh scattering coefficient for typical single mode fiber is small, and only a fraction of the scattered light is captured by the core, the backscattered signal is low, which limits the sensing distance and sensitivity.

Figure 7:
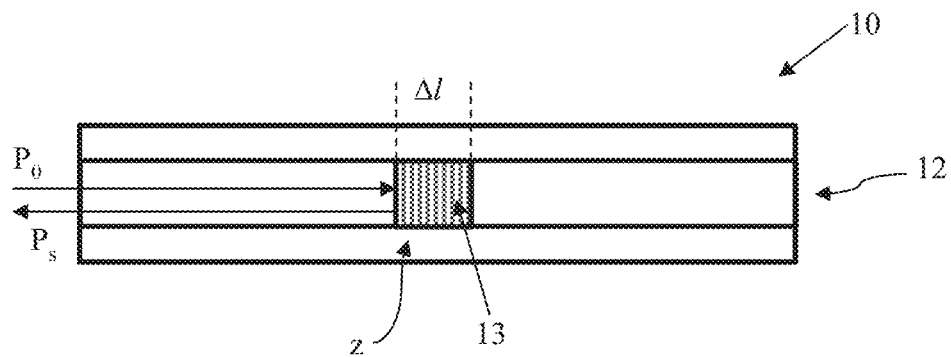
FIG. 7 depicts a Bragg grating formed continuously along an optical fiber in accordance with some embodiments of the current disclosure.
Figure 8:
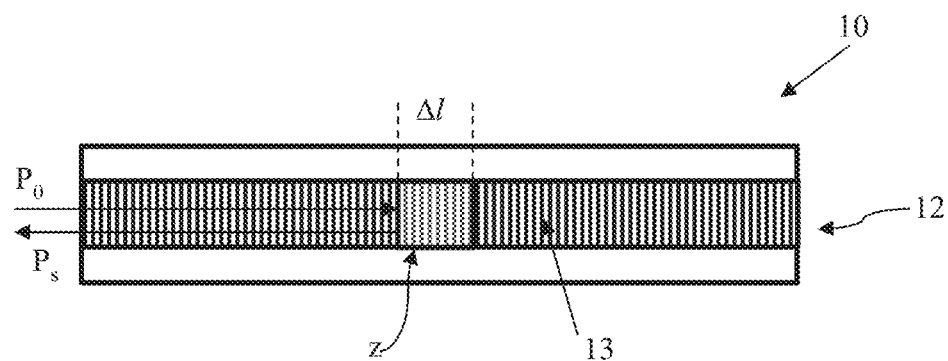
FIG. 8 depicts a Bragg grating formed discretely along an optical fiber in accordance with some embodiments of the current disclosure

To increase the scattering coefficient, Bragg gratings (also referred to herein as optical gratings) are created along the optical fiber using UV light exposure. For a Bragg grating, light is reflected when the phase matching condition is satisfied. The wavelength $\lambda$ that is reflected is determined by Equation (10).

$$\lambda = 2n_{eff}\Lambda \qquad (10)$$

where Λ is the period of grating, and $n_{eff}$ is the effective index of the guided mode. Because the reflection by the grating is within the fiber core, the capture efficacy is about 100%. In addition, because the scattered light is only in the backward direction, the attenuation increase is much smaller than increasing Rayleigh scattering, which happens in all the directions. The Bragg grating 13 can be implemented either discretely along the optical fiber as shown in FIG. 7 or continuously as show in in FIG. 8. The Bragg grating can have a period of about 200 nm to about 1500 microns depending on the operating wavelength, fiber core profile design, and intended application. For backscattering applications, the period is 200 nm to 5000 nm. For transmission device applications, the period is 100 microns to 1500 microns. The operating wavelength can be from 600 nm to 1700 nm for silica glass based optical fiber, for example, 850 nm, 1060 nm, 1310 nm, 1550 nm. The optical rating reflectivity depends on the strength of the grating. The optical grating reflectance of a weak grating is in the range about $1 \times 10^{-6}$ to about $2 \times 10^{-4}$ per meter, more preferably between $1 \times 10^{-6}$ and $1 \times 10^{-4}$ per meter. The optical grating reflectance of a strong grating is greater than $1 \times 10^{-6}$ per device to almost 1 per device.

Unlike existing methods of forming the optical gratings which require removing the coating from the optical fiber, fabricating the gratings, and recoating the fiber for protection, the method of the current disclosure allows for formation of optical gratings onto the core region of the optical fiber through the coating layer.

An example of an optical fiber is shown in schematic cross-sectional view in FIG. 1. In some embodiments, as depicted in FIG. 1, the optical fiber 10 includes glass fiber 11 surrounded by an optional low-modulus inner coating 16 and a high-modulus coating 18. In some embodiments, the glass fiber 11 is surrounded only by the high-modulus coating 18 without the optional low-modulus inner coating 16. The glass fiber 11 includes a core region 12 and a cladding region 14, as is known in the art. Preferably the core is doped with germania for UV photosensitivity. The fiber can be treated with hydrogen loading to increase further the photosensitivity. Further description of the fiber draw process, glass fiber 11, optional low-modulus inner coating 16, high-modulus coating 18 is provided below.

A typical fiber coating thickness with acrylate polymer materials is 62.5 μm, which is too thick to transmit UV light. To write an optical grating on such a fiber, the coating materials must be removed and, after the grating is written, the fiber needs to be recoated to protect the glass. Alternatively, an optical fiber with a UV transparent coating can be used, however such a fiber which is more expensive than UV curable coatings, and the coating is difficult to apply with high draw speeds (e.g. at greater than 10 m/s, or preferably greater than 20 m/s, or preferably greater than 50 m/s, or more preferably greater than 60 m/s).

FIG. 5 depicts an exemplary system 500 for forming Bragg gratings on the core region 12 of optical fiber 10. In some embodiments, the coated optical fiber 10 is positioned on a first fiber reel 502 and transferred to a second fiber reel 504 via a reel winding system (not shown). As the optical fiber 10 is transferred between the first fiber reel 502 and transferred to a second fiber reel 504, the optical fiber 10 is exposed to a laser beam 506 from a laser source 508, focused through a phase mask 508, with sufficient power to modify the refractive index of the core region 12 through the coating to create the optical gratings. The laser may be UV excimer-laser at 248 nm wavelength, or frequency-doubled argon-ion laser at 244 nm wavelength. The laser may be an Argon-Fluoride laser at 193 nm wavelength. Femtosecond IR laser may also be used to inscribe gratings onto the fiber core. A phase mask is an one dimensional periodic structure with transparent and opaque regions. Light passes through the transparent regions and is blocked by the opaque regions. When the fiber is exposed to the light through the phase mask, a periodic grating structure is created in the fiber core through photosensitivity effect, which modulate periodically the refractive index of core. Optical devices such as fiber Bragg grating can also be fabricated using various optical interferometry and point-by-point direct writing methods. The total thickness of the coating (i.e. either the optional low-modulus inner coating and the high-modulus coating or only the high-modulus coating) is less than 25 um, more preferably less than 20 um, and even more preferably less than 10 um. In some embodiments, the total thickness of the polymer coating is about 2 um to about 20 um. The laser 502 can be a UV laser or IR laser. The laser 506 can be a continuous wave or pulsed laser. The phase mask 508 modulates the light intensity and phase of the laser 506 to form grating patterns.

Glass Fiber

As shown in FIG. 1, glass fiber 11 includes a core region 12 and a cladding region 14, as is known in the art. Core region 12 has a higher refractive index than cladding region 14, and glass fiber 11 functions as a waveguide. In many applications, core region 12 and cladding region 14 have a discernible core-cladding boundary. Alternatively, core region 12 and cladding region 14 can lack a distinct boundary.

In some embodiments, core region 12 has a refractive index that varies with distance from the center of the glass fiber. For example, core region 12 may have a relative refractive index profile with an α-profile (as defined by Eq. (3) above) with an α value that is greater than or equal to 2 and less than or equal to 100, or for example between 2 and 10, between 2 and 6, between 2 and 4, between 4 and 20, between 6 and 20, between 8 and 20, between 10 and 20, or between 10 and 40.

Figure 2:
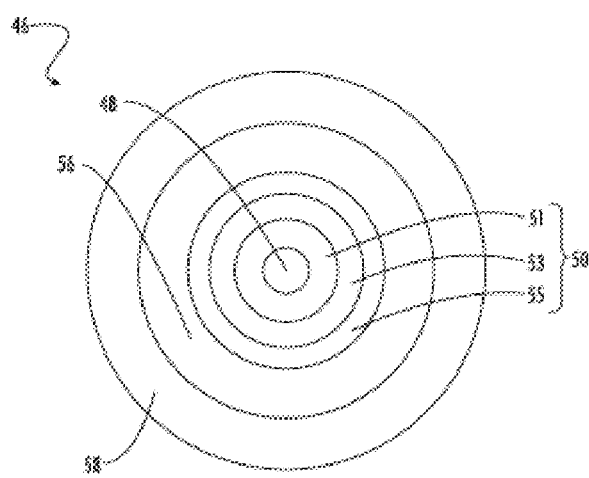
FIG. 2 depicts a cross-section of a single-mode optical fiber in accordance with some embodiments of the current disclosure.

A schematic cross-sectional depiction of an exemplary optical fiber is shown in FIG. 2. In FIG. 2, optical fiber 46 includes core region 48, cladding region 50, optional low-modulus inner coating 56, and high-modulus coating 58. Cladding region 50 includes inner cladding region 51, depressed-index cladding region 53, and outer cladding region 55.

Figure 3:
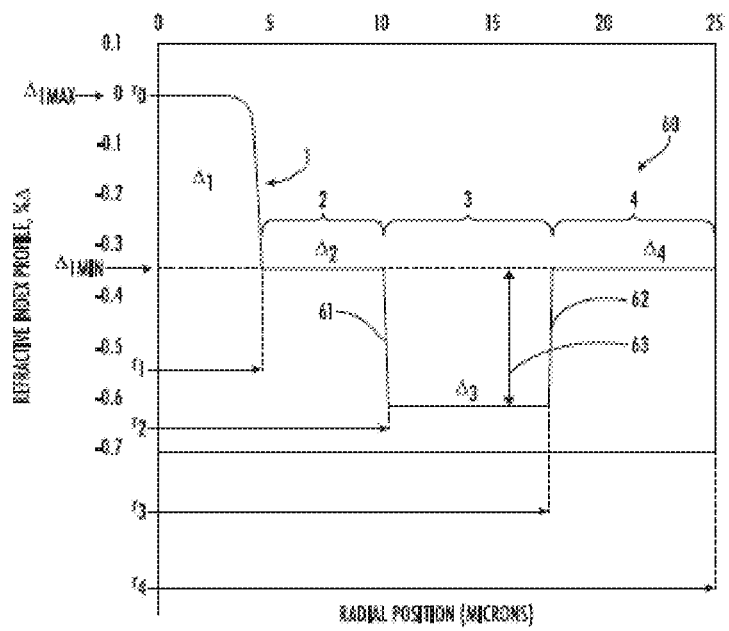
FIG. 3 depicts a relative refractive index profile of a single-mode optical fiber in accordance with some embodiments of the current disclosure.

A representative relative refractive index profile for a glass fiber, according to embodiments of the present disclosure, is shown in FIG. 3. The profile of optical fiber 60 of FIG. 3 shows a core region (1) with outer radius $r_1$ and relative refractive index $\Delta_1$ with maximum relative refractive index $\Delta_{1max}$, an inner cladding region (2) extending from radial position $r_i$ to radial position $r_2$ and having relative refractive index $\Delta_2$, a depressed-index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 3, the depressed-index cladding region (3) may be referred to herein as a trench and has a constant or average relative refractive index that is less than the relative refractive indices of the inner cladding region (2) and the outer cladding region (4). Core region (1) has the highest average and maximum relative refractive index in the profile. Core region (1) may include a lower index region at or near the centerline (known in the art as a "centerline dip")

(not shown). Core region (1) may include a higher index region at or near the centerline (referred to as a "centerline spike") (not shown).

In the relative refractive index profile of FIG. 3, the core region (1) of the glass fiber has an α-profile with an α value greater than or equal to 2 and less than or equal to 20. The radial position $r_0$ (corresponding to $\Delta_{1max}$) of the α-profile corresponds to the centerline (r=0) of the fiber and the radial position $r_2$ of the α-profile corresponds to the core radius $r_1$. In embodiments with a centerline dip, the radial position $r_0$ may be offset from the centerline of the fiber. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In FIG. 3, transition region 61 from inner cladding region (2) to depressed-index cladding region (3) and transition region 62 from depressed-index cladding region (3) to outer cladding region (4) are shown as step changes. It is to be understood that a step change is an idealization and that transition region 61 and/or transition region 62 may not be strictly vertical in practice as depicted in FIG. 3. Instead, transition region 61 and/or transition region 62 may have a slope or curvature. When transition region 61 and/or transition region 62 are non-vertical, the inner radius $r_2$ and outer radius $r_3$ of depressed-index cladding region (3) correspond to the mid-points of transition regions 61 and 62, respectively. The mid-points correspond to half of the depth 63 of the depressed-index cladding region (3).

The relative ordering of relative refractive indices $\Delta_1$, $\Delta_2$, $\Delta_3$, and $\Delta_4$ in the relative refractive index profile shown in FIG. 3 satisfy the conditions $\Delta_{1max} > \Delta_4 > \Delta_3$ and $\Delta_{1max} > \Delta_2 > \Delta_3$. The values of $\Delta_2$ and $\Delta_4$ may be equal or either may be greater than the other, but both $\Delta_2$ and $\Delta_4$ are between $\Delta_{1max}$ and $\Delta_3$.

The relative refractive indices $\Delta_1$, $\Delta_2$, $\Delta_3$, and $\Delta_4$ are based on the materials used in the core region, inner cladding region, depressed-index cladding region, and outer cladding region. A description of these material with regard to the relative refractive indices $\Delta_1$, $\Delta_2$, $\Delta_3$, and $\Delta_4$ is provided below.

Figure 4:
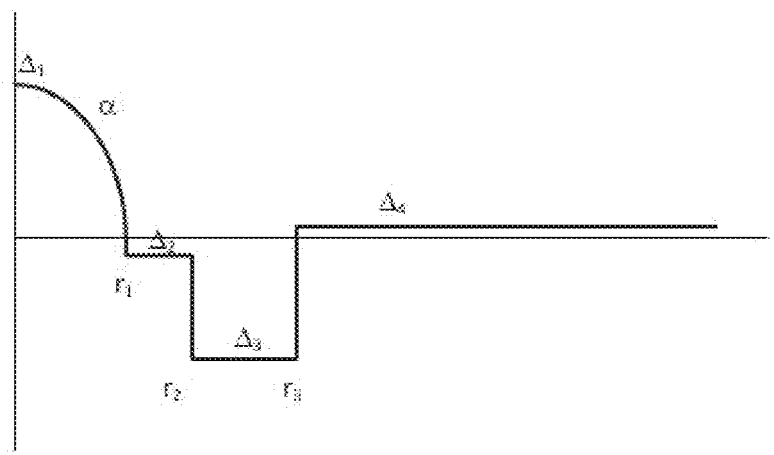
FIG. 4 depicts a relative refractive index profile of a single-mode optical fiber in accordance with some embodiments of the current disclosure.

While FIG. 3 depicts a schematic cross-sectional depiction of one exemplary optical fiber, other suitable optical fibers may be used with embodiments described herein. For example, FIG. 4 is a schematic cross-sectional depiction of a generic profile design for a single mode fiber that may be used with embodiments described herein. The profile of optical fiber of FIG. 4 shows a core region with outer radius $r_1$ and relative refractive index $\Delta_1$, an inner cladding region extending from radial position $r_1$ to radial position $r_2$ and having relative refractive index $\Delta_2$, a depressed-index cladding region extending from radial position $r_2$ to radial position $r_3$ and having relative refractive index $\Delta_3$, and an outer cladding region extending from radial position $r_3$ to radial position $r_4$ and having relative refractive index $\Delta_4$.

Core Region

The core region comprises silica glass. The silica glass of the core region may be undoped silica glass, updoped silica glass, and/or downdoped silica glass. Updoped silica glass includes silica glass doped with an alkali metal oxide (e.g. $Na_2O$, $K_2O$, $Li_2O$, $Cs_2O$, or $Rb_2O$). Downdoped silica glass includes silica glass doped with F. In one embodiment, the silica glass of the core region may be doped with Ge. In one embodiment, the silica glass of the core region may be Ge-free and/or Cl-free; that is the core region comprises silica glass that lacks Ge and/or Cl.

Additionally, or alternatively, the core region may comprise silica glass doped with at least one alkali metal, such as, lithium (Li), sodium (Na), potassium (K), rubidium (Rb), cesium (Cs) and/or francium (Fr). In some embodiments, the silica glass is doped with a combination of sodium, potassium, and rubidium. The silica glass may have a peak alkali concentration in the range from about 10 ppm to about 500, or in the range from about 20 ppm to about 450 ppm, or in the range from about 50 ppm to about 300 ppm, or in the range from about 10 ppm to about 200 ppm, or in the range from about 10 ppm to about 150 ppm. The alkali metal doping within the disclosed ranges results in lowering of Rayleigh scattering, thereby proving a lower optical fiber attenuation.

In some embodiments, the core region comprises silica glass doped with an alkali metal and doped with F as a downdopant. The concentration of in the core of the fiber is in the range from about 0.1 wt % to about 2.5 wt %, or in the range from about 0.25 wt % to about 2.25 wt %, or in the range from about 0.3 wt % to about 2.0 wt %.

In other embodiments, the core region comprises silica glass doped with Ge and/or Cl. The concentration of $GeO_2$ in the core of the fiber may be in a range from about 2.0 to about 20 wt %, or in a range from about 3.0 to about 10 wt %, or in a range from about 4.0 to about 7 wt. %. The concentration of Cl in the core of the fiber may be in a range from 1.0 wt % to 6.0 wt %, or in a range from 1.2 wt % to 5.5 wt %, or in a range from 1.5 wt % to 5.0 wt %, or in a range from 2.0 wt % to 4.5 wt %, or greater than or equal to 1.5 wt % (e.g., ≥2 wt %, ≥2.5 wt %, ≥3 wt %, ≥3.5 wt %, ≥4 wt %, ≥4.5 wt %, ≥5 wt %, etc.).

In embodiments where the core is substantially free of Ge or Cl, the relative refractive index $\Delta_1$ or $\Delta_{1max}$ of the core region is in the range from about −0.10% to about 0.20%, or in the range from about −0.05% to about 0.15%, or in the range from about 0.0% to about 0.10%. The minimum relative refractive index $\Delta_{1min}$ of the core is in the range from about −0.20% to about −0.50%, or in the range from about −0.30% to about −0.40%, or in the range from about −0.32% to about −0.37%. The difference $\Delta_{1max}$ to $\Delta_{1min}$ is greater than 0.05%, or greater than 0.10%, or greater than 0.15%, or greater than 0.20%, or in the range from 0.05% to 0.40%, or in the range from 0.10% to 0.35%.

In embodiments where the core is doped with Ge and/or Cl, the relative refractive index $\Delta_1$ or $\Delta_{1max}$ of the core region is in the range from about 0.20% to about 1%, or in the range from about 0.25% to about 0.5%, or in the range from about 0.30% to about 0.38%. The minimum relative refractive index $\Delta_{1min}$ of the core is in the range from about −0.05% to about −0.05%, or in the range from about −0.03% to about 0.03%, or in the range from about −0.02% to about 0.02%. The difference $\Delta_{1max}$ to $\Delta_{1min}$ is greater than 0.20%, or greater than 0.25%, or greater than 0.30%, or in the range from 0.25% to 0.45%, or in the range from 0.30% to 0.40%.

The radius $r_1$ of the core region is in the range from about from about 3.0 microns to about 6.5 microns, or in the range from about 3.5 microns to about 6.0 microns, or in the range from about 4.0 microns to about 6.0 microns, or in the range from about 4.5 microns to about 5.5 microns. In some embodiments, the core region includes a portion with a constant or approximately constant relative refractive index that has a width in the radial direction of at least 1.0 micron, or at least 2.0 microns, or at least 3.0 microns, or in the range from 1.0 microns to 3.0 microns, or in the range from 2.0 microns to 3.0 microns. In some embodiments, the portion of the core region having a constant or approximately constant relative refractive index has a relative refractive index of $\Delta_{1min}$.

Inner Cladding Region

In embodiments in which the core is substantially free of Ge and Cl, the inner cladding region is comprised of downdoped silica glass that is doped with F. The average concentration of downdopant in the inner cladding region is greater than the average concentration of downdopant in the core region.

The relative refractive index $\Delta_2$ or $\Delta_{2max}$ of the inner cladding region is in the range from about −0.20% to about −0.50%, or in the range from about −0.25% to about −0.45%, or in the range from about −0.30% to about −0.40%, or in the range from about −0.33% to about −0.37%. The relative refractive index $\Delta_2$ is preferably constant or approximately constant. The difference $\Delta_{1max}-\Delta_2$ (or the difference $\Delta_{1max}-\Delta_{2max}$) is greater than about 0.25%, or greater than about 0.30%, or greater than about 0.35%, or in the range from about 0.25% to about 0.45%, or in the range from about 0.30% to about 0.40%.

The radius $r_2$ of the inner cladding region n the range from about 7.0 microns to about 15.0 microns, or in the range from about 7.5 microns to about 13.0 microns, or in the range from about 8.0 microns to about 12.0 microns, or in the range from about 8.5 microns to about 11.5 microns, or in the range from about 9.0 microns to about 11.0 microns, or in the range from about 9.5 microns to about 10.5 microns. The thickness $r_2-r_1$ of the inner cladding region is in the range from about 3.0 microns to about 10.0 microns, or from about 4.0 microns to about 9.0 microns, or from about 4.5 microns to about 7.0 microns.

In embodiments in which the core is doped with Ge and/or Cl, the inner cladding region comprises silica that is substantially free of Ge and/or Cl. The relative refractive index $\Delta_2$ or $\Delta_{2max}$ of the inner cladding region is in the range from about −0.05% to about −0.05%, or in the range from about −0.03% to about 0.03%, or in the range from about −0.02% to about 0.02%. The relative refractive index $\Delta_2$ is preferably constant or approximately constant. The difference $\Delta_{1max}-\Delta_2$ (or the difference $\Delta_{1max}-\Delta_{2max}$) is greater than about 0.20%, or greater than about 0.25%, or greater than about 0.30%, or in the range from about 0.25% to about 0.40%, or in the range from about 0.30% to about 0.38%.

The radius $r_2$ of the inner cladding region is in the range from about 8.0 microns to about 16.0 microns, or in the range from about 9.0 microns to about 15.0 microns, or in the range from about 10.0 microns to about 14.0 microns, or in the range from about 10.5 microns to about 13.5 microns, or in the range from about 11.0 microns to about 13.0 microns. The thickness $r_2-r_1$ of the inner cladding region is in the range from about 3.0 microns to about 10.0 microns, or from about 4.0 microns to about 9.0 microns, or from about 5.0 microns to about 8.0 microns.

Depressed-Index Cladding, Region

The depressed-index cladding region comprises downdoped silica glass. As discussed above, the preferred downdopant is fluorine. The concentration of fluorine in the depressed-index cladding region is in the range from about 0.30 wt % to about 2.50 wt %, or in the range from about 0.60 wt % to about 2.25 wt %, or in the range from about 0.90 wt % to about 2.00 wt %.

The relative refractive index $\Delta_3$ or $\Delta_{3min}$ is in the range from about −0.30% to about −0.80%, or in the range from about −0.40% to about −0.70%, or in the range from about −0.50% to about −0.65%. The relative refractive index $\Delta_3$ is preferably constant or approximately constant. The difference $\Delta_{1max}-\Delta_3$ (or the difference $\Delta_{1max}-\Delta_{3max}$ or the difference $\Delta_1-\Delta_3$, or the difference $\Delta_1-\Delta_{3min}$) is greater than about 0.50%, or greater than about 0.55%, or greater than about 0.6%, or in the range from about 0.50% to about 0.80%, or in the range from about 0.55% to about 0.75%. The difference $\Delta_2-\Delta_3$ (or the difference $\Delta_2-\Delta_{3min}$, or the difference $\Delta_{2max}-\Delta_3$, or the difference $\Delta_{2max}-\Delta_{3min}$) is greater than about 0.10%, or greater than about 0.20%, or greater than about 0.30%, or in the range from about 0.10% to about 0.70%, or in the range from about 0.20% to about 0.65%.

The inner radius of the depressed-index cladding region is $r_2$ and has the values specified above. The outer radius $r_3$ of the depressed-index cladding region is in the range from about 10.0 microns to 20.0 microns, or in the range from about 12.0 microns to about 19.5 microns, or in the range from about 13.0 microns to about 19.0 microns, or in the range from about 13.5 microns to about 18.5 microns, or in the range from about 14.0 microns to about 18.0 microns, or in the range from about 14.5 microns to about 17.5 microns. The thickness $r_3-r_2$ of the depressed-index cladding region is in the range from 1.0 microns to 12.0 microns, or in the range from about 2.0 microns to about 10.0 microns, or in the range from about 2.5 microns to about 9.0 microns, or in the range from about 3.0 microns to about 8.0 microns.

The depressed-index cladding region may be an offset trench design with a trench volume of about 30%$\Delta$-micron$^2$ or greater, or about 50%$\Delta$-micron$^2$ or greater, or about 75%$\Delta$-micron$^2$ or less, or about 30%$\Delta$-micron$^2$ or greater and about 75%$\Delta$-micron$^2$ or less, or about 50%$\Delta$-micron$^2$ or greater and about 75%$\Delta$-micron$^2$ or less. Trench volumes lower than the disclosed ranges have reduced bending performance, and trench volumes higher than the disclosed ranges no longer operate as single-mode fibers.

The offset trench designs disclosed herein provide advantages over traditional trench designs that are adjacent to the core region. More specifically, the offset trench designs disclosed herein reduce confinement of the fundamental mode and provide improved bend loss at large bend diameters (e.g., bend diameters >25 mm) for target optical fiber mode field diameter and cable cutoff characteristics. Furthermore, the trench designs disclosed herein have a depressed index trench region, which advantageously confines the intensity profile of the fundamental LP01 mode propagating through the optical fiber, thereby reducing the optical fiber mode field diameter.

Outer Cladding Region

In embodiments in which the core is substantially free of Ge and Cl, the outer cladding region comprises downdoped silica glass. The preferred downdopant is fluorine. The concentration of fluorine in the outer cladding region is in the range from about 0.30 wt % to about 2.20 wt %, or in the range from about 0.60 wt % to about 2.00 wt %, or in the range from about 0.90 wt % to about 1.80 wt %. The relative refractive index $\Delta_4$ or $\Delta_{4max}$ of the outer cladding region is in the range from about −0.20% to about −0.50%, or in the range from about −0.25% to about −0.45%, or in the range from about −0.30% to about −0.40%, or in the range from about −0.33% to about 0.37%. The relative refractive index $\Delta_4$ is preferably constant or approximately constant. As shown in FIG. 5, the relative refractive index $\Delta_4$ may be approximately equal to the relative refractive index $\Delta_2$.

In an embodiment, the outer cladding is substantially pure silica. Alternatively, the outer cladding may be doped with Cl to a relative refractive index in the range from about 0.01% to about 0.1%, or from about 0.02% to about 0.08%, or from about 0.03% to about 0.06%. The concentration of Cl in the outer cladding may range from about 0.1 wt % to about 1.0 wt %, from about 0.2 wt % to about 0.8 wt %, or from about 0.3 wt % to about 0.6 wt %. Alternatively the outer cladding may be doped with Titania to strengthen the cladding surface so as to stop defects such as scratches from propagating through the fiber. In some embodiments, the outer cladding may be doped with a Titania concentration of about 5 wt % to about 25 wt %. In some embodiments, the thickness of the Titania-doped layer is 1 μm to 20 μm.

The inner radius of the outer cladding region is $r_3$ and has the values specified above. The outer radius $r_4$ is preferably about 125 microns to facilitate splicing to conventional 125 micron cladding diameter fibers using cladding-alignment splicers. The outer radius $r_4$ of the outer cladding region is in the range from 60.0 microns to 65.0 microns, or in the range from 61.0 microns to 64.0 microns, or in the range from 62.0 microns to 63.0 microns, or in the range from 62.25 microns to 62.75 microns. Thus, for example, the diameter of the cladding region (i.e., outer radius $r_4$ multiplied by 2) in the range from 120.0 microns to 130.0 microns, or in the range from 122.0 microns to 128.0 microns, or in the range from 124.0 microns to 126.0 microns, or in the range from 124.5 microns to 125.5 microns. The thickness $r_4-r_3$ of the outer cladding region is in the range from about 20.0 microns to about 60.0 microns, or in the range from about 30.0 microns to about 55.0 microns, or in the range from about 40.0 microns to about 50.0 microns.

Coating Properties

The transmissivity of light through an optical fiber is highly dependent on the properties of the coatings applied to the glass fiber. As discussed above (and with reference to FIG. 2), the coatings may include an optional low-modulus inner coating 56 and a high-modulus coating 58, where the high-modulus coating surrounds the optional low-modulus inner coating and the optional low-modulus inner coating contacts the glass fiber (which includes a central core region surrounded by a cladding region).

High-modulus coating 58 is a harder material (higher Young's modulus) than the optional low-modulus coating 56 and is designed to protect the glass fiber from damage caused by abrasion or external forces that arise during processing, handling, and deployment of the optical fiber. Optional low-modulus inner coating 56 is a softer material (lower Young's modulus) than high-modulus coating 58 and is designed to buffer or dissipates stresses that result from forces applied to the outer surface of the high-modulus coating. The optional low-modulus coating may help dissipate stresses that arise due to the microbends the optical fiber encounters when deployed in a cable but is not essential for short length applications such as optical interconnects. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the optional low-modulus coating minimizes intensity losses caused by microbending.

The total thickness of the polymer coating is less than 25 um, more preferably less than 20 um, and even more preferably less than 10 um. In some embodiments, the total thickness of the polymer coating is about 2 um to about 20 um.

Coating Examples—Preparation and Measurement Techniques

The properties of optional low-modulus inner coating and high-modulus coating, as disclosed herein, were determined using the measurement techniques described below:

Tensile Properties. The curable high-modulus coating compositions were cured and configured in the form of cured rod samples for measurement of Young's modulus, tensile strength at yield, yield strength, and elongation at yield. The cured rods were prepared by injecting the curable high-modulus composition into Teflon® tubing having an inner diameter of about 0.025". The rod samples were cured using a Fusion D bulb at a dose of about 2.4 J/cm² (measured over a wavelength range of 225-424 nm by a Light Bug model IL390 from International Light). After curing, the Teflon® tubing was stripped away to provide a cured rod sample of the high-modulus coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 min/min. Tensile properties were measured according to ASTM Standard D882-97. The properties were determined as an average of at least five samples, with defective samples being excluded from the average.

In Situ Glass Transition Temperature. In situ $T_g$ measurements were performed on fiber tube-off samples obtained from fibers having a low-modulus inner coating surrounded by a high-modulus coating. The coated fibers included a glass fiber having a diameter of 125 microns, a low-modulus inner coating with thickness 32.5 microns surrounding and in direct contact with the glass fiber, and a high-modulus coating with thickness 26.0 microns surrounding and in direct contact with the glass fiber. The glass fiber and low-modulus coating were the same for all samples measured. The low-modulus coating was formed from the reference low-modulus coating composition described below. Samples with a comparative high-modulus coating and a high-modulus coating in accordance with the present disclosure were measured.

The fiber tube-off samples were obtained using the following procedure: a 0.0055" Miller stripper was clamped down approximately 1 inch from the end of the coated fiber. The one-inch region of fiber was plunged into a stream of liquid nitrogen and held in the liquid nitrogen for 3 seconds. The coated fiber was then removed from the stream of liquid nitrogen and quickly stripped to remove the coating. The stripped end of the fiber was inspected for residual coating. If residual coating remained on the glass fiber, the sample was discarded, and a new sample was prepared. The result of the stripping process was a clean glass fiber and a hollow tube of stripped coating that included the intact low-modulus inner coating and the high-modulus coating. The hollow tube is referred to as a "tube-off sample". The diameters of the glass, low-modulus inner coating and high-modulus coating were measured from the end-face of the unstrapped fiber.

In-situ Tg of the tube-off samples was run using a Rheometrics DMTA IV test instrument at a sample gauge length of 9 to 10 mm. The width, thickness, and length of the tube-off sample were input to the operating program of the test instrument. The tube-off sample was mounted and then cooled to approximately −85° C. Once stable, the temperature ramp was run using the following parameters:

Frequency: 1 Hz

Strain: 0.3%

Heating Rate: 2° C./min.

Final Temperature: 150° C.

Initial Static Force=20.0 g

Static >Dynamic Force by=10.0%

The in-situ Tg of a coating is defined as the maximum value of tan δ in a plot of tan δ as a function of temperature, where tan δ is defined as:

$$\tan\delta = E'' / E'$$

and E" is the loss modulus, which is proportional to the loss of energy as heat in a cycle of deformation and E' is the storage or elastic modulus, which is proportional to the energy stored in a cycle of deformation.

The tube-off samples exhibited distinct maxima in the tan δ plot for the low-modulus inner coating and high-modulus coating. The maximum at lower temperature (about −50° C.) corresponded to the in-situ Tg for the low-modulus inner coating and the maximum at higher temperature (above 50° C.) corresponded to the in-situ Tg for the high-modulus coating.

In Situ Modulus of Low-Modulus Inner Coating. In embodiments that include this optional coating layer, the in situ modulus was measured using the following procedure. A six-inch sample of fiber was obtained and a one-inch section from the center of the fiber was window-stripped and wiped with isopropyl alcohol. The window-stripped fiber was mounted on a sample holder/alignment stage equipped with 10 mm×5 mm rectangular aluminium tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was removed, and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9e−6 l/s for a time of forty-five minutes at room temperature (21° C.). The gauge length was 15 mm. Force and the change in length were recorded and used to calculate the in situ modulus of the low-modulus coating. The tab-mounted fiber samples were prepared by removing any epoxy from the tabs that would interfere with the 15 mm clamping length of the testing apparatus to ensure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed, and the sample was removed once the analysis was completed.

In Situ Modulus of the High-Modulus Coating. For the high-modulus coating, the in situ modulus was measured using fiber tube-off samples prepared from the fiber samples. A 0.0055 inch Miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consists of a hollow tube with a low-modulus inner coating and the high-modulus coating. The diameters of the glass, the low-modulus inner coating, and the high-modulus coating were measured from the end-face of the unstripped fiber sample.

The fiber tube-off samples were run using a Rheometrics DMTA IV instrument at a sample gauge length 11 mm to obtain the in situ modulus of the high-modulus coating. The width, thickness, and length were determined and provided as input to the operating software of the instrument. The sample was mounted and run using a time sweep program at ambient temperature (21° C.) using the following parameters:

Frequency: 1 Rad/sec

Strain: 0.3%

Total Time=120 sec

Time Per Measurement=1 sec

Initial Static Force=15.0 g

Static>Dynamic Force by=10.0%

Once completed, the last five E' (storage modulus) data points were averaged. Each sample was run three times (fresh sample for each run) for a total of fifteen data points. The averaged value of the three runs was reported.

Puncture Resistance of the High-Modulus Coating. Puncture resistance measurements were made on samples that included a glass fiber, and a low-modulus inner coating surrounded by a high-modulus coating. The glass fiber had a cladding diameter of 125 microns. Samples with various high-modulus coatings were prepared as described below. The thicknesses of the low-modulus inner coating and high-modulus coating were adjusted to vary the cross-sectional area of the high-modulus coating as described below. The ratio of the thickness of the high-modulus coating to the thickness of the low-modulus inner coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the $52^{nd}$ International Wire Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the thickness of the high-modulus coating was equivalent on both sides of the glass fiber in a direction parallel to the glass slide. In this position, the thickness of the high-modulus coating was equal on both sides of the optical fiber in a direction parallel to the glass slide. The thickness of the high-modulus coating in the directions normal to the glass slide and above or below the glass fiber differed from the thickness of the high-modulus coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the high-modulus coating. The diamond wedge was then driven into the high-modulus coating at a rate of 0.1 mm/min and the load on the high-modulus coating was measured. The load on the high-modulus coating increased as the diamond wedge was driven deeper into the high-modulus coating until puncture occurred, at which point a precipitous decrease in load was observed. The indentation load at which puncture was observed was recorded and is reported herein as grams of force (g) and referred to herein as "puncture load". The experiment was repeated with the optical fiber in the same orientation to obtain ten measurement points, which were averaged to determine a puncture load for the orientation. A second set of ten measurement points was taken by rotating the orientation of the optical fiber by 180°.

Macrobending Loss. Macrobending loss was determined using the mandrel wrap test specified in standard IEC 60793-1-47. In the mandrel wrap test, the fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the fiber about the the mandrel. Macrobending losses at a wavelength of 1310 nm, 1550 nm and 1625 nm were determined for selected examples described below with the mandrel wrap test using mandrels with diameters of 10 mm, 15 mm and 20 mm.

Exemplary Embodiments of Optical Fibers with Low-Modulus Inner Coatings Surrounded by High-Modulus Coatings The specific properties of the optional low-modulus inner coating 56 and high-modulus coating 58 may be tailored to provide sufficient robustness and microbending characteristics for the smaller diameter fibers disclosed herein. For example, low-modulus coating 56 may have a low Young's modulus and/or a low in situ modulus. The Young's modulus of the low-modulus coating is less than or equal to about 0.7 MPa, or less than or equal to about 0.6 MPa, or less than or equal to 0.5 about MPa, or less than or equal to about 0.4 MPa, or in the range from about 0.1 MPa to about 0.7 MPa, or in the range from about 0.3 MPa to about 0.6 MPa. The in situ modulus of the low-modulus coating is less than or equal to about 0.50 MPa, or less than or equal to about 0.30 MPa, or less than or equal to about 0.25 MPa, or less than or equal to about 0.20 MPa, or less than or equal to about 0.15 MPa, or less than or equal to about 0.10 MPa, or in the range from about 0.05 MPa to about 0.25 MPa, or in the range from about 0.10 MPa to about 0.20 MPa.

Low-modulus coating 56 preferably has a higher refractive index than cladding region 50 of the glass fiber in order to allow it to strip errant optical signals away from core region 48. Low-modulus coating 56 should maintain adequate adhesion to the glass fiber during thermal and hydrolytic aging, yet still be strippable from the glass fiber for splicing purposes.

To facilitate smaller diameter optical fibers, the low-modulus inner coating may be absent or have a smaller thickness than the low-modulus coating used in conventional optical fibers. The high-modulus coating 58 may have a smaller thickness and a smaller cross-sectional area compared to conventional optical fibers. However, high-modulus coating 58 must still maintain the required robustness and puncture resistance needed for high reliability in undersea cables and repeaters. As the thickness of the high-modulus coating decreases, its protective function diminishes. Puncture resistance is a measure of the protective function of the cross-sectional area of the outer coatings, which include the high-modulus coating and the optional pigmented outer coating. A high-modulus coating with a higher puncture resistance withstands greater impact without failing and provides better protection for the glass fiber.

In order to provide the required robustness and puncture resistance, high-modulus coating 58 may have an in situ modulus greater than about 1500 MPa, or greater than about 1600 MPa, or greater than about 1800 MPa, or greater than about 2200 MPa, or greater than about 2500 MPa, or greater than about 2600 MPa, or greater than about 2700 MPa, or in the range from about 1600 MPa to about 3000 MPa, or in the range from about 1800 MPa to about 2800 MPa, or in the range from about 2000 MPa to about 2800 MPa, or in the range from about 2400 MPa to about 2800 MPa.

Low-modulus and high-modulus coatings are typically formed by applying a curable coating composition to the glass fiber as a viscous liquid and curing. The optical fiber may also include a pigmented outer coating that surrounds the high-modulus coating. The pigmented outer coating may include coloring agents to mark the optical fiber for identification purposes and typically has a Young's modulus similar to the Young's modulus of the high-modulus coating.

High-modulus coating 58 may be comprised of a trifunctional monomer. A glass transition temperature (Tg) of high-modulus coating 58 may be greater than about 50° C., or greater than about 60° C., or greater than about 70° C., or greater than about 80° C., or greater than about 90° C., or greater than about 100° C.

Suitable low-modulus inner coatings 56 and high-modulus coatings 58 may be used so that optical fiber 46 has a puncture resistance greater than or equal to about 28 g, or greater than or equal to about 30 g, or greater than or equal to about 32 g, or greater than or equal to about 34 g, or greater than or equal to about 36 g, or greater than or equal to about 38 g, or greater than or equal to about 40 g, when the cross-sectional area of the high-modulus coating is less than about 10,000 microns$^2$.

Suitable low-modulus inner coatings 56 and high-modulus coatings 58 may be used so that optical fiber 46 has a puncture resistance greater than or equal to about 22 g, or greater than or equal to about 24 g, or greater than or equal to about 26 g, or greater than or equal to about 28 g, or greater than or equal to about 30 g, when the cross-sectional area of the high-modulus coating is less than about 8,000 microns$^2$.

Reduced Diameter Exemplary Embodiments

As discussed above, the optical fibers of the embodiments disclosed herein may have a glass diameter of about 125 microns and a reduced coating diameter may have an outer diameter of about 175 microns or less, or about 170 microns or less, or about 165 microns or less, or about 160 microns or less, or about 145 microns or less. It is noted that the outer diameter of cladding region 50 is the glass diameter of optical fiber 46 and that the outer diameter of high-modulus coating 58 may be the outer overall diameter of optical fiber 46 (when an outer pigmented outer coating layer is not applied).

In some exemplary examples, cladding region 50 has an outer diameter of about 125 microns and high-modulus coating 58 has an outer diameter between about 155 and 175 microns, or cladding region 50 has an outer diameter of about 125 microns and high-modulus coating 58 has an outer diameter between about 160 and 170 microns.

To facilitate a decrease in the diameter of the optical fiber, it is preferable to minimize the thickness $r_5-r_4$ of the low-modulus inner coating or to eliminate it entirely. The thickness $r_5-r_4$ of the low-modulus coating is less than or equal to about 8.0 microns, or less than or equal to about 7.0 microns, or less than or equal to about 6.0 microns, or less than or equal to about 5.0 microns, or in the range from about 4.0 microns to about 8.0 microns, or in the range from about 5.0 microns to about 7.0 microns. However, elimination or reduction in the thickness of the low-modulus inner coating of an optical fiber will increase microbending sensitivity. This increased sensitivity is mitigated in the disclosed design through the addition of an off-set trench with a volume greater than about 30% Δ-micron$^2$.

The radius $r_6$ of the high-modulus coating is less than or equal to about 87.5 microns, or less than or equal to about 85.0 microns, or less than or equal to about 82.5 microns, or less than or equal to about 80.0 microns. It is also preferable to optimize the thickness $r_6-r_5$ of the high-modulus coating to balance the reduction in the diameter of the fiber with having a sufficiently high cross-sectional area for high puncture resistance. The thickness $r_6-r_5$ of the high-modulus coating is less than or equal to about 25.0 microns, or less than or equal to about 20.0 microns, or less than or equal to about 15.0 microns, or in the range from about 15.0 microns to about 25.0 microns, or in the range from about 17.5 microns to about 22.5 microns, or in the range from about 18.0 microns to about 22.0 microns. The total thickness of the low-modulus coating and the high modulus coating is about 25 microns or less, preferably about 20 microns or less. In some embodiments, the total thickness of the low-modulus coating and the high modulus coating is about 10 microns to about 25 microns.

Thus, optical fibers in accordance with the embodiments of the present disclosure have reduced coating diameters compared to traditional optical fibers.

Table 4 below shows an average coating thickness for five high-modulus coating samples. Examples 1 and 2 compared with Examples 3, 4, and 5 show that average high-modulus coating thicknesses in the range of 8.0 microns to 20.0 microns produced higher tensile strength than average thicknesses below this range. The higher tensile strength exhibited by Examples 1 and 2 enable use of thinner high-modulus coatings on optical fibers.

TABLE 4

| Thickness of High-modulus Coating | | | | | |
|---|---|---|---|---|---|
| Example No. | 1 | 2 | 3 | 4 | 5 |
| Average High-modulus Coating Thickness | 10.2 microns | 10.7 microns | 6.7 microns | 6.7 microns | 6.0 microns |
| Tensile Strength (100 kpsi screening rate) | 89% | 93% | 4% | 26% | 24% |

Exemplary Low-Modulus and High-Modulus Coatings

Exemplary low-modulus and high-modulus coatings are discussed below, along with measurements of strength and puncture resistance of the coatings.

Low-Modulus Coating—Composition. The low-modulus coating composition includes the formulation given in Table 5 below and is typical of commercially available low-modulus coating compositions.

TABLE 5

| Reference Low-modulus Coating Composition | |
|---|---|
| Component | Amount |
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis (3-mercaptopropionate) | 0.032 pph |

Where the oligomeric material was prepared as described herein from H12MDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BAST), 3-acryloxypropyl trimethoxysilane is an adhesion promoter (available from Gelest), and pentaerythritol tetrakis(3-mercaptopropionate) (also known as tetrathiol, available from Aldrich)) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

The oligomeric material was prepared by mixing H12MDI (4,4'-methylene bis(cyclohexyl isocyanate)), dibutyltin dilaurate and 2,6-di-tert-butyl-4-methylphenol at room temperature in a 500 mL flask. The 500 mL flask was equipped with a thermometer, a $CaCl_2$ drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement.

High-Modulus Coating—Compositions. Four curable high-modulus coating compositions (A, SB, SC, and SD) are listed in Table 6.

TABLE 6

High-modulus Coating Compositions

| Component | Composition | | | |
|---|---|---|---|---|
| | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 20.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPD (a photoinitiator) is (2,4,6-trimethylbenzoyl)diphenyl phosphine oxide (available from BASF), Irgacure 184 (a photoinitiator) is 1-hydroxycyclohexyl-phenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) silicone-ethylene oxide/propylene oxide copolymer (available from Dow Chemical). The concentration unit "pph" refers to an amount relative to a base composition that includes all monomers and photoinitiators. For example, for high-modulus coating composition A, a concentration of 1.0 pph for DC-190 corresponds to 1 g DC-190 per 100 g combined of PE210, M240, M2300, TPO, and Irgacure 184.

High-Modulus Coatings—Tensile Properties. The Young's modulus, tensile strength at yield, yield strength, and elongation at yield of high-modulus coatings made from high-modulus compositions A, SB, SC, and SD were measured using the technique described above. The results are summarized in Table 7.

TABLE 7

Tensile Properties of High-modulus Coatings

| Property | High-modulus Composition | | | |
|---|---|---|---|---|
| | A | SB | SC | SD |
| Young's Modulus (MPa) | 2049.08 | 2531.89 | 2652.51 | 2775.94 |
| Tensile Strength (MPa) | 86.09 | 75.56 | 82.07 | 86.08 |
| Yield Strength (MPa) | 48.21 | 61.23 | 66.37 | 70.05 |
| Elongation at Yield (%) | 4.60 | 4.53 | 4.76 | 4.87 |
| Fracture Toughness, $K_c$ ($MPa*m^{1/2}$) | 0.8580 | 0.8801 | 0.9471 | 0.9016 |

The results show that high-modulus coatings prepared from compositions SB, SC, and SD exhibited higher Young's modulus and higher yield strength than the high-modulus coating prepared from comparative composition A. Additionally, the high-modulus coatings prepared from compositions SB, SC, and SD exhibited higher fracture toughness than the high-modulus coating prepared from composition A. The higher values exhibited by composition SB, SC, and SD enable use of thinner high-modulus coatings on optical fibers without sacrificing performance.

Fiber Draw Process

The optical fibers disclosed herein may be formed from a continuous optical fiber manufacturing process, during which a glass fiber is drawn from a heated preform and sized to a target diameter. In fibers comprising a low-modulus inner coating, the glass fiber is then cooled and directed to a coating system that applies a liquid low-modulus coating composition to the glass fiber. Two process options are viable after application of the liquid low-modulus coating composition to the glass fiber. In one process option (wet-on-dry process), the liquid low-modulus coating composition is cured to form a solidified low-modulus coating, the liquid high-modulus coating composition is applied to the cured low-modulus coating, and the liquid high-modulus coating composition is cured to form a solidified high-modulus coating. In a second process option (wet-on-wet process), the liquid high-modulus coating composition is applied to the liquid low-modulus coating composition, and both liquid coating compositions are cured simultaneously to provide solidified low-modulus and high-modulus coatings. After the fiber exits the coating system, the fiber is collected and stored at room temperature. Collection of the fiber typically entails winding the fiber on a spool and storing the spool.

In some processes, the coating system further applies a pigmented outer coating composition to the high-modulus coating and cures the pigmented outer coating composition to form a solidified pigmented outer coating. Typically, the pigmented outer coating is an ink layer used to mark the fiber for identification purposes and has a composition that includes a pigment and is otherwise similar to the high-modulus coating. The pigmented outer coating is applied to the high-modulus coating and cured. The high-modulus coating has typically been cured at the nine of application of the pigmented outer coating. The low-modulus, high-modulus, and pigmented outer coating compositions can be applied and cured in a common continuous manufacturing process. Alternatively, the low-modulus and high-modulus coating compositions are applied and cured in a common continuous manufacturing process, the coated fiber is collected, and the pigmented outer coating composition is applied and cured in a separate offline process to form the pigmented outer coating.

Coating Application, Coating Material Viscosity and Coating Die Size

In some embodiments, optical fiber drawn from a preform within a draw furnace, is passed through a coating system where a polymer coating is applied to the optical fiber. The coating system may comprise an entrance and a sizing die. Disposed between the entrance and the sizing die is a coating chamber. The coating chamber is filled with the polymer coating material in liquid form. The optical fiber enters the coating system through the entrance and passes through the coating chamber where the polymer coating material is applied to the surface of the optical fiber. The optical fiber then passes through the sizing die where any excess coating material is removed as the optical fiber exits the coating system to achieve a coated optical fiber of a specified diameter in accordance of some embodiments described herein.

Example of Fiber with Weak Grating

Figure 10A:
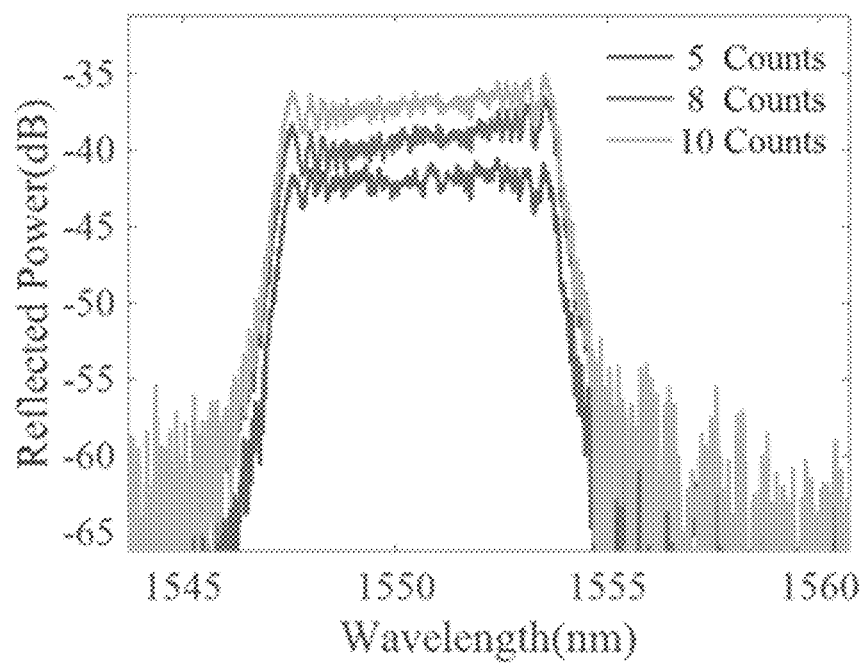
FIG. 10A is reflected spectra of the chirped FBG on thin coated fiber with diameter of 140 μm after 5, 8 and 10 counts.
Figure 10B:
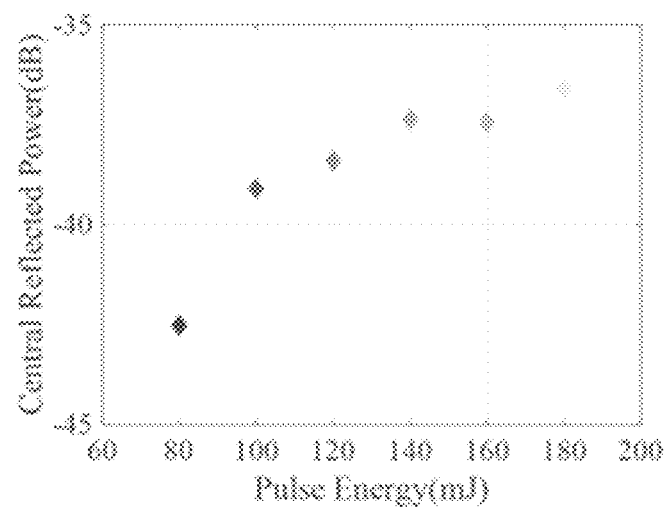
FIG. 10B is the reflectance at central Bragg wavelength of the chirped FBG when this thin coated fiber was exposed to the same number of counts (10 counts) of laser radiation at different pulse energy.

A thin coated fiber was tested to inscribe weak fiber Bragg gratings (FBG). An KrF 248 nm laser and a chirped phase mask were used in the grating writing process. The focused beam size is about 4 cm×300 µm. The optical frequency domain reflectometer (OFDR) was deployed to characterize the reflected spectrum of the written FBG. A 2 cm-long chirped weak FBG with central Bragg wavelength at ~1551 nm irradiated at different pulse energy was inscribed in the experiment to characterize the performance of the thin-coated fiber. The reflected spectra of the chirped ultra-weak FBG exposed to 5, 8 and 10 counts of laser radiation at 180 mJ on thin coated fiber with diameter of 140 mm is shown in FIG. 10A. The reflectivity and the Bragg wavelength increase with the number of laser shots. FIG. 10B shows reflectance at central Bragg wavelength of the chirped FBG when this thin coated fiber was exposed to the same number of counts (10 counts) of laser radiation at different pulse energy. As the UV pulse energy increases, the reflectivity of the ultra-weak FBG written after the same pulse shots increases.

Figure 11:
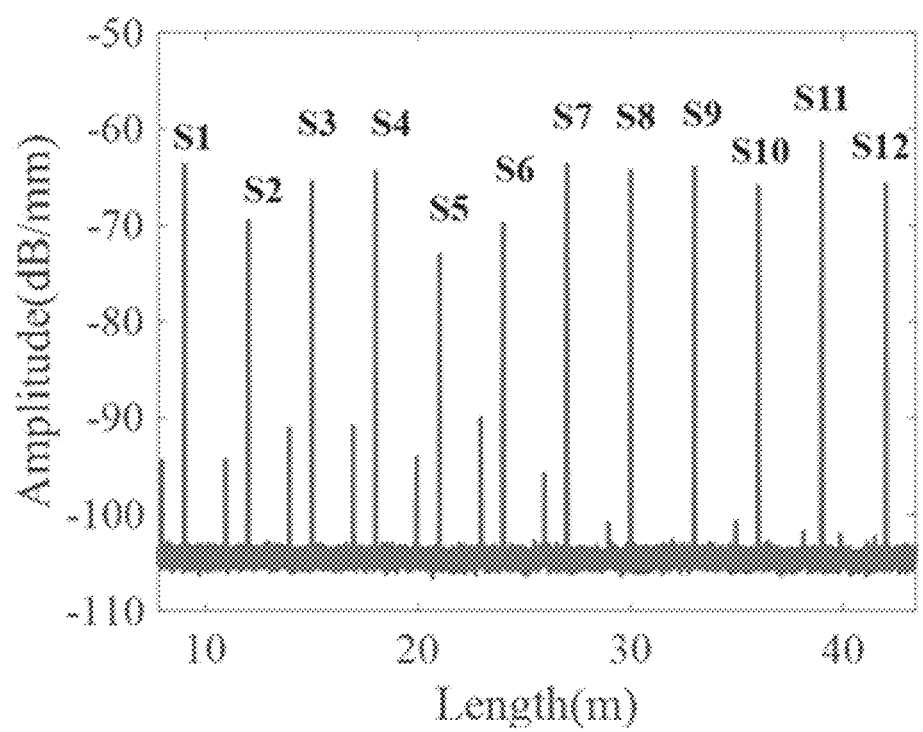
FIG. 11 is measured spatial distribution of the ultra-weak FBG array sensor

A FBG array sensor was formed with 12 weak FBG was written on the thin coated fiber with diameter of 140 mm under UV radiation. The backscattered signal profile of the sensor is shown in the FIG. 11. These gratings can act as sensing elements for distributed acoustic sensing.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method, comprising:
providing an optical fiber comprising a core region, a cladding region surrounding the core region and a coating surrounding the cladding region;
wherein the core and cladding have a combined outer diameter of 100 µm to 125 µm,
wherein the coating has a thickness of less than or equal to 20 µm, and wherein the coating comprises one of: (i) a high-modulus coating layer surrounding the cladding region, wherein the high-modulus coating layer has a Young's modulus of greater than or equal to 0.5 GPa; or (ii) a low-modulus coating layer surrounding the cladding region and a high-modulus coating layer surrounding the low-modulus coating layer, wherein the low-modulus coating layer has a Young's modulus of less than or equal to 5 MPa and the high-modulus coating layer has a Young's modulus of greater than or equal to 0.5 GPa; and
exposing the core, through the coating, to a pattern of ultraviolet radiation to form an optical grating within the core.

2. The method of claim 1, wherein a ratio of a thickness of the low-modulus coating layer to a thickness of the high-modulus coating layer is from 0.8 to 1.2.

3. The method of claim 1, wherein the coated optical fiber has a diameter of less than or equal to 145 µm.

4. The method of claim 1, wherein the cladding of the optical fiber comprises a Titania-doped layer.

5. The method of claim 1, wherein the coating has a thickness of less than or equal to 15 µm.

6. The method of claim 1, wherein the coating has a thickness of less than or equal to 10 µm.

7. The method of claim 1, wherein the coating has a thickness of less than or equal to 2 µm.

8. The method of claim 1, wherein the coating is a UV curable material.

9. The method of claim 1, wherein the optical grating has a period of about 200 nm to about 1500 microns.

10. The method of claim 1, wherein the optical grating reflectivity is about $1 \times 10^{-6}$ to about $2 \times 10^{-4}$ per meter.

11. The method of claim 1, further comprising transferring the optical fiber from a first reel to a second reel while exposing the core, through the coating, to a pattern of ultraviolet radiation to form an optical grating within the core.

12. An optical fiber comprising:
a core region having a plurality of optical gratings within the core
a cladding region surrounding the core region, wherein the core and cladding have a combined outer diameter of 100 µm to 125 µm; and
a coating surrounding the cladding region, wherein the coating has a thickness of less than or equal to 20 µm, and wherein the coating comprises one of: (i) a high-modulus coating layer surrounding the cladding region, wherein the high-modulus coating layer has a Young's modulus of greater than or equal to 0.5 GPa; or (ii) a low-modulus coating layer surrounding the cladding region and a high-modulus coating layer surrounding the low-modulus coating layer, wherein the low-modulus coating layer has a Young's modulus of less than or equal to 5 MPa and the high-modulus coating layer has a Young's modulus of greater than or equal to 0.5 GPa.

13. The optical fiber of claim 12, wherein a ratio of a thickness of the low-modulus coating layer to a thickness of the high-modulus coating layer is from 0.8 to 1.2.

14. The optical fiber of claim 12, wherein the coated optical fiber has a diameter of less than or equal to 145 μm.

15. The optical fiber of claim 12, wherein the cladding of the optical fiber comprises a Titania-doped layer.

16. The optical fiber of claim 12, wherein the coating has a thickness of less than or equal to 15 μm.

17. The optical fiber of claim 12, wherein the coating is a UV curable material.

18. The optical fiber of claim 12, wherein the optical grating has a period of about 200 nm to about 1500 microns.

19. The optical fiber of claim 12, wherein the optical grating reflectivity is about $1\times10^{-6}$ to about $2\times10^{-4}$ per meter.

20. An optical sensing system, comprising:
    a control system comprising a light source, a light detector, and a processor;
    an optical fiber; and
    a light transmitting member operably coupling the optical fiber to the control system, wherein the optical fiber comprises:
        a core region having a plurality of optical gratings within the core;
        a cladding region surrounding the core region, wherein the core and cladding have a combined outer diameter of 100 μm to 125 μm; and
        a coating surrounding the cladding region, wherein the coating has a thickness of less than or equal to 20 μm, and wherein the coating comprises one of: (i) a high-modulus coating layer surrounding the cladding region, wherein the high-modulus coating layer has a Young's modulus of greater than or equal to 0.5 GPa; or (ii) a low-modulus coating layer surrounding the cladding region and a high-modulus coating layer surrounding the low-modulus coating layer, wherein the low-modulus coating layer has a Young's modulus of less than or equal to 5 MPa and the high-modulus coating layer has a Young's modulus of greater than or equal to 0.5 GPa.

* * * * *

UNITED STATES PATENT AND TRADEMARK OFFICE
CERTIFICATE OF CORRECTION

PATENT NO. : 11,698,483 B2
APPLICATION NO. : 17/538285
DATED : July 11, 2023
INVENTOR(S) : Peng Chen et al.

Page 1 of 1

It is certified that error appears in the above-identified patent and that said Letters Patent is hereby corrected as shown below:

In the Claims

In Column 28, Line 57, in Claim 12, delete "core" and insert -- core; --.

Signed and Sealed this
Fifth Day of December, 2023

Katherine Kelly Vidal
*Director of the United States Patent and Trademark Office*